(12) United States Patent
Tee

(10) Patent No.: US 7,006,821 B2
(45) Date of Patent: Feb. 28, 2006

(54) METHOD AND APPARATUS FOR DYNAMICALLY DETERMINING A MOBILE STATION'S ACTIVE SET DURING A CONNECTION RESCUE PROCEDURE

(75) Inventor: Lai King Tee, San Diego, CA (US)

(73) Assignee: Denso Corporation, Kariya (JP)

(*) Notice: Subject to any disclaimer, the term of this patent is extended or adjusted under 35 U.S.C. 154(b) by 433 days.

(21) Appl. No.: 10/006,048

(22) Filed: Dec. 4, 2001

(65) Prior Publication Data

US 2002/0111158 A1  Aug. 15, 2002

Related U.S. Application Data

(60) Provisional application No. 60/251,244, filed on Dec. 4, 2000.

(51) Int. Cl.
*H04M 11/00* (2006.01)

(52) U.S. Cl. .................. 455/421; 455/456.1; 455/440; 455/436; 455/422.1; 455/67.11; 455/423; 455/450; 370/331; 370/342

(58) Field of Classification Search ................ 455/456, 455/437, 443, 33.1, 421, 456.1, 440, 436, 455/422.1, 67.1, 423, 450; 375/457; 370/331, 370/342

See application file for complete search history.

(56) References Cited

U.S. PATENT DOCUMENTS

| 5,081,671 A | 1/1992 | Raith et al. |
| 5,267,261 A | 11/1993 | Blakeney, II et al. |
| 5,301,356 A | 4/1994 | Bodin et al. |
| 5,353,332 A | 10/1994 | Raith et al. |
| 5,530,912 A | 6/1996 | Agrawal et al. |
| 5,640,414 A * | 6/1997 | Blakeney et al. ........... 375/130 |
| 5,673,259 A | 9/1997 | Quick, Jr. et al. |
| 5,722,044 A * | 2/1998 | Padovani et al. ........... 455/443 |
| 5,729,826 A | 3/1998 | Gavrilovich |
| 5,749,055 A | 5/1998 | Dahlin |
| 5,781,856 A | 7/1998 | Jacobs et al. |
| 5,884,174 A | 3/1999 | Nagarajan et al. |
| 5,913,167 A | 6/1999 | Bonta et al. |
| 5,937,019 A | 8/1999 | Padovani |
| 6,052,594 A | 4/2000 | Chuang et al. |
| 6,061,337 A * | 5/2000 | Light et al. ................. 370/331 |
| 6,104,927 A | 8/2000 | Willey |
| 6,161,014 A | 12/2000 | Girardeau et al. |
| 6,233,454 B1 * | 5/2001 | Sato ........................... 455/437 |

(Continued)

FOREIGN PATENT DOCUMENTS

EP  1 024 606 A2  8/2000

*Primary Examiner*—Sonny Trinh
*Assistant Examiner*—Khai Nguyen
(74) *Attorney, Agent, or Firm*—Morrison & Foerster LLP

(57) ABSTRACT

A method for allowing a mobile station (MS) to dynamically adjust its T_ADD_R and T_DROP_R pilot signal strength thresholds (established by pilot $E_c/I_o$ values) used to add or drop pilots from the MS's active set during rescue. Dynamic adjustment of T_ADD_R and T_DROP_R allows the MS to select and add BSs (sectors) with sufficient forward link quality into their active sets and drop BSs (sectors) with poorer forward link quality during a call recovery procedure to recover an active connection before it is dropped. In addition, the effectiveness of recovering an active connection is improved through corresponding actions at the BS. The BS may use the signal strength measurements, active set information, and other pilot information to update its own active set for use in generating a forward rescue channel.

39 Claims, 8 Drawing Sheets

U.S. PATENT DOCUMENTS

| | | | |
|---|---|---|---|
| 6,236,365 B1 * | 5/2001 | LeBlanc et al. | 342/457 |
| 6,246,872 B1 | 6/2001 | Lee et al. | |
| 6,253,083 B1 | 6/2001 | Hacena et al. | |
| 6,337,983 B1 | 1/2002 | Bonta et al. | |
| 6,343,216 B1 | 1/2002 | Kim et al. | |
| 6,345,185 B1 | 2/2002 | Yoon et al. | |
| 6,360,100 B1 | 3/2002 | Grob et al. | |
| 6,434,367 B1 * | 8/2002 | Kumar et al. | 455/70 |
| 6,445,918 B1 | 9/2002 | Hellander | |
| 6,477,162 B1 * | 11/2002 | Bayley et al. | 370/342 |
| 6,512,927 B1 | 1/2003 | Hunzinger | |
| 6,519,456 B1 * | 2/2003 | Antonio et al. | 455/442 |
| 6,519,457 B1 | 2/2003 | Jiang et al. | |
| 6,542,744 B1 | 4/2003 | Lin | |
| 6,567,666 B1 | 5/2003 | Czaja et al. | |
| 6,580,919 B1 | 6/2003 | Saito | |
| 6,606,343 B1 | 8/2003 | Zeira et al. | |
| 6,671,265 B1 | 12/2003 | Hwang et al. | |
| 6,674,736 B1 | 1/2004 | Tiedemann, Jr. | |
| 6,785,551 B1 * | 8/2004 | Richard | 455/456.1 |
| 2001/0055969 A1 | 12/2001 | Bonta et al. | |
| 2002/0034947 A1 | 3/2002 | Soliman | |
| 2002/0037726 A1 | 3/2002 | Czaja et al. | |
| 2002/0142776 A1 | 10/2002 | Tiedemann, Jr. | |
| 2003/0002525 A1 | 1/2003 | Grilli | |
| 2003/0022630 A1 | 1/2003 | Gandhi et al. | |
| 2004/0233883 A1 | 11/2004 | Ludwig et al. | |

* cited by examiner

Forward Link
  Pilot Channel(s)
  Sync Channel
  Paging Channel(s)
  Traffic Channels Reverse Link
  Control Channel(s)
  Access Channel
  Traffic Channel(s)

METHOD AND APPARATUS FOR DYNAMICALLY DETERMINING A MOBILE STATION'S ACTIVE SET DURING A CONNECTION RESCUE PROCEDURE

CROSS-REFERENCE TO RELATED APPLICATIONS

Embodiments of the present invention claim priority from U.S. provisional patent application Ser. No. 60/251,244 entitled "An Algorithm for a Mobile Unit to Determine Its Active Set for Soft Handoff During a Call Rescue Procedure," filed Dec. 4, 2000, and are related to U.S. utility application Ser. No. 09/978,974 entitled "Forward Link Based Rescue Channel Method and Apparatus for Telecommunication Systems," filed Oct. 16, 2001, the contents of which are incorporated herein by reference for all purposes.

BACKGROUND OF THE INVENTION

1. Field of the Invention

The present invention relates, generally, to communication network management and, in one embodiment, to a method and apparatus for dynamically determining a mobile station's active set during a connection rescue procedure.

2. Description of Related Art

Introduction

Rather than just providing a means for emergency communications, cellular telephones are rapidly becoming a primary form of communication in today's society. As cellular telephone usage becomes widespread, cellular telephone networks are becoming increasingly prevalent and are providing coverage over larger areas to meet consumer demand. FIG. 1 depicts an example of a mobile station (MS) 10 operated by a mobile user that roves through a geographic area served by a wireless infrastructure or network including a first base station (BS) 12 with wireless sectors A 14 and sector B 16, and a second BS 18, with a sector C 20. In the course of such roving, MS 10 travels from position A to position B to position C and will, as a matter of course, experience variations in signal strength and signal quality of the communication link associated with the BS(s) that it is in contact with. Signal strength and quality can be especially undependable near the edges of the sectors, such as when the MS 10 transitions from the area defined by the dotted line of Sector A 14 to the area defined by the dotted line of Sector B 16, or from Sector B 16 to Sector C 20. It is in these transition areas, as well as other areas of weak signal strength or quality, where dropped connections are likely to occur. A connection as referred to herein includes, but is not limited to, voice, multimedia video or audio streaming, packet switched data and circuit switched data connections, short message sequences or data bursts, and paging.

Dropped connections can range from being a nuisance to devastating for cellular telephone users. For example, a dropped emergency 911 connection can be critical or even fatal. Dropped connections can create consumer frustration significant enough to cause the consumer to change service providers. Thus, the prevention of dropped connections is of major importance to cellular network providers.

Cellular Telephone Networks

FIG. 2 illustrates an exemplary communication link 22 between a MS 24 and a BS 26. Communications from the BS 26 to the MS 24 are called the forward link, and communications from the MS 24 to the BS 26 are called the reverse link. A BS 26 is typically comprised of multiple sectors, usually three. Each sector includes a separate transmitter and antenna (transceiver) pointed in a different direction. Because a cell site can be omni or sectorized, it should be understood that the terms BS and sector are used herein somewhat interchangeably. The forward and reverse links utilize a number of forward and reverse channels. For example, the BS 26 communicates with the MSs using a plurality of forward common channels or links which may include, but are not limited to, one or more pilot channels, a sync channel, and one or more paging channels, discussed in greater detail below. These channels are referred to as common channels because the BS 26 may communicate those channels to all MSs in the network. Generally, these common channels are not used to carry data, but are used to broadcast and deliver common information.

Each sector within BS 26 broadcasts a pilot channel that identifies that sector and is simple for a MS 24 to decode. Both sectors and pilot channels are distinguished by pseudo-noise (PN) offsets. The word "pilot" can be used almost interchangeably with the term sector, because a pilot channel identifies a sector. The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS. When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message. In general, each BS may utilize one pilot channel, one sync channel and one paging channel that are common for all MSs to receive. However, because there are practical limitations on the number of MSs that can be simultaneously paged using one paging channel, some BSs may employ multiple paging channels.

In addition to the forward common channels described above, the BS 26 communicates with individual MSs using a plurality of forward dedicated channels or links which may include, but are not limited to, multiple traffic channels, multiple supplemental channels, and multiple access channels and control channels. These channels are referred to as dedicated channels because the BS communicates the channels to a specific MS 24, and the channels may carry data.

The reverse channels or links may include an access channel and one or more reverse traffic channels and control channels. After a MS receives an incoming page from a BS, the MS will initiate a connection setup using, in part, an access channel.

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window.

Code division multiple access (CDMA) is a technique for spread-spectrum multiple-access digital communications that creates channels through the use of unique code sequences. It allows a number of MSs to communicate with one or more BSs in neighboring cell sites, simultaneously using the same frequency. In CDMA, given a space of frequency and time, each channel is assigned a particular orthogonal code such as a Walsh code or a quasi-orthogonal function (QOF). In direct sequence CDMA, the data from each channel is coded using Walsh codes or QOFs and then combined into a composite signal. This composite signal is spread over a wide frequency range at a particular time.

When this composite signal is de-spread using the same code used to spread the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary.

In CDMA systems, signals can be received in the presence of high levels of narrow-band or wide-band interference. The practical limit of signal reception depends on the channel conditions and interference level. Types of interference include those generated when the signal is propagated through a multi-path channel, signals transmitted to and from other users in the same or other cell sites, as well as self-interference or noise generated at the device or MS. However, noise and interference in the field may require error correction to determine what was actually transmitted.

The CDMA wireless communication system is fully described by the following standards, all of which are published by the TELECOMMUNICATIONS INDUSTRY ASSOCIATION, Standards & Technology Department, 2500 Wilson Blvd., Arlington, Va. 22201, and all of which are herein incorporated by reference: TIA/EIA-95A, published in 1993; TIA/EIA-95B, published Feb. 1, 1999; TIA/EIA/IS-2000, Volumes 1–5, Release A, published Mar. 1, 2000; TIA/EIA-98D, published Jun. 1, 2001; and WCDMA standards 3GPP TS 25.214 V4.2.0 published September 2001, TS25.401 V5.1.0 published September 2001, TS 25.331 V4.2.0 published Oct. 8, 2001, and TR 25.922 V4.1.0 published Oct. 2, 2001.

As described above with reference to an example CDMA system, orthogonal codes may be used to code a particular channel. For example, the simple-to-decode pilot channel described above may use a fixed, known code such as the all one coded $W_0$ Walsh code. Similarly, the sync channel may use the alternating polarity $W_{32}$ Walsh code. In addition to the orthogonal codes used to define channels such as traffic channels, for example, privacy scrambling may also be added such that a MS can only read the data on the traffic channel that it can unscramble. This privacy scrambling may be accomplished by the use of a mask in conjunction with the orthogonal code.

Each MS groups the BS sectors into various sets, which may include, but is not limited to, an active set, a neighbor set, a candidate set, and a remaining set, discussed in further detail below.

The MS active set contains the PN offset identifiers of pilots corresponding to the BS sectors that are communicating with the MS at any point in time. However, it should be noted that for purposes of simplifying the description herein, the MS active set may be identified as containing "pilots." Thus, when a MS is idle, but monitoring a single BS for pages and overhead updates, the active set for that MS will contain that BS pilot's PN offset identifier as its only member. There may be instances, however, when a MS is being handed off from one BS or sector to another, and during this handoff may actually be in communication with multiple BSs or sectors at the same time. When this occurs, multiple active pilots will be in the active set at the same time. For example, in a "soft handoff," a MS in communication with BS "A" will begin to communicate with a BS "B" without first dropping BS "A," and as a result both BS "A" and "B" will be in the active set. In a "softer handoff," a MS in communication with sector "A" in BS "A" will begin to communicate with a sector "B" in BS "A" without first dropping sector "A," and as a result both sector "A" and "B" will be in the active set. In a "hard hand-off," however, a MS in communication with BS "A" will begin to communicate with a BS "B" only after first dropping BS "A," and as a result either BS "A" or "B" will be in the active set at any one time, but not both.

During the time in which the MS is in communication with multiple BSs, the MS assigns rake receiver fingers to multiple channels from one or more sectors at the same time. When a MS is in communication with multiple BSs at the same time, the MS should be receiving the same data from both of those BSs. However, although the data may be the same, it may be communicated differently from different BSs because the channels may be different. The rake receiver will therefore receive encoded data from different sectors on different channels, demodulate those sectors independently, and then combine the data. When the data is combined through maximum ratio combining or other similar combining algorithms, the data from a strong channel may be weighted more heavily than data from a weak channel, which is likely to have more errors. Thus, the data with a higher likelihood of being correct is given higher weight in generating the final result.

When a MS is idle, a neighbor list which includes BSs that are neighbors to the active BS is received by the MS on a common channel. However, when a MS is active and communicating with a BS through a traffic channel, the neighbor set is updated on a traffic channel.

Any other BSs in the network that are not in the active, neighbor, or candidate sets (discussed below) comprise the remaining set. As illustrated in FIG. 3, whether a MS is idle or active, the network repeatedly sends overhead messages 30, 32 and 34 to the MS. These overhead messages contain information about the configuration of the network. For example, the extended neighbor list overhead message 34 tells the MS what neighbors exist and where to look for them. These neighbor identifiers are stored, at least temporarily, within the memory of the MS.

The candidate set is a set of BSs that the MS has requested as part of its active set, but have not yet been promoted to the active set. These candidate BSs have not yet been promoted because the network has not sent a hand-off direction message (HDM) to the MS in reply to the message from the MS, directing that MS change its active set to include these BSs. Typically, the exchange of such messages occurs as part of the handoff process, described below.

Handoffs

FIG. 4 depicts a generic structure of a wireless infrastructure 56. A client MS 36 continually monitors the strength of pilot channels it is receiving from neighboring BSs, such as BS 38, and searches for a pilot that is sufficiently stronger than a "pilot add threshold value" for handoffs (T_ADD_H), which can be a static value or dynamic value as described in the standards. The neighboring pilot channel information, known in the art as a Neighbor Set, may be communicated to the MS through network infrastructure entities including BS controllers (BSC) 40 that may control a cell cluster 42, and communicates with a mobile switching center (MSC) 44. It should be understood that the MS and one or more of these network infrastructure entities contain one or more processors for controlling the functionality of the MS and the network. The processors include memory and other peripheral devices well understood by those skilled in the art. As the MS 36 moves from the region covered by one BS 38 to another, the MS 36 promotes pilots having a signal strength greater than T_ADD_H from the Neighbor Set to the Candidate Set, and notifies the BS 38 or BSs of the promotion of certain pilots from the Neighbor Set to the Candidate Set via a Pilot Strength Measurement Message (PSMM). The PSMM also contains information on the strength of the received pilot signals. The BS 38 determines a new BS or network active set according to the received PSMM, and may notify the MS 36 of the new active set via an HDM. It should be noted, however, that the new active set may not always exactly comply with the MS's request, because the network may have BS resource considerations to deal with.

The MS 36 may maintain communication with all the BSs and BS sectors that are included in the new Active set. When the active set contains more than one BS, the MS is said to be in soft handoff with those BSs. When the active set contains more than one sector originating from the same BS, the MS is in softer handoff with those sectors.

The MS 36 typically maintains communications with all the BSs and BS sectors in the active set so long as the pilots for each BS are stronger than a "pilot drop threshold value" for handoffs (T_DROP_H). When one of the pilots weakens to less than T_DROP_H for a time exceeding T_TDROP (a time limit which prevents pilots with temporary dips in signal strength from being dropped), the MS 36 notifies the BSs of the change through a PSMM. The network may then determine a new active set that will typically not include the BS or sector whose pilot was reported to have degraded below T_DROP_H for a duration of T_TDROP, and notify the MS 36 of that new active set. Upon notification by the network, the MS 36 then demotes the weakened pilot to the Neighbor Set. This mechanism enables soft and softer handoffs. Note that most of the parameters used in the soft handoff process, such as T_ADD_H and T_DROP_H, are determined or at least limited by the network.

Soft handoff allows a MS to maintain communication with one or more BSs (sectors) simultaneously while the condition of any one of these links is not sufficient to allow successful communication through a single link. This also happens when the MS is moving away from a region served by one BS (sector) into a region that is served by a different BS (sector), to avoid any interruption in the communication between the MS and switching center.

It is typical for a MS 36 to be starting a handoff or in the process of handoff when connections fail and are dropped. This is expected because poor coverage or weak signal environments generally exist near cell boundaries, in areas where the signal to interference ratios change abruptly, in areas of pilot pollution, or areas significantly affected by cell breathing, capacity limitations, network resource availability, and network coverage, all which are well known in the art.

Dropped Connections

A dropped connection may manifest in a number of ways. FIG. 5 shows a situation known in the art as a Layer 2 Acknowledgment Failure for a CDMA wireless network. In the example of FIG. 5, the MS is transmitting a PSMM 48 requiring an acknowledgment by the BS. The BS may be receiving it correctly, but in the case shown in FIG. 5, the MS is not receiving the BS's acknowledgment (ACK) 46. The MS will retransmit the message $N_{1m}$ (=9) times in accordance with a retransmission counter and then terminate (drop) the connection. It is common for this type of failure to occur when the message that the Layer 2 Acknowledgment Failure occurs for is a PSMM 48 which includes a request for a pilot that is needed by the MS to maintain the connection.

FIG. 6 shows a second situation for which recovery is possible using the current invention in a CDMA wireless network. This situation is known in the art as a Forward Link Fade Failure. A fade is a period of attenuation of the received signal power. In this situation, the MS receives $N_{2m}$ (=12) consecutive bad frames 50, the response to which is to disable its transmitter 52. If it is then unable to receive $N_{3m}$ (=2) consecutive good frames before a fade timer expires after $T_{5m}$ (=5) seconds, the MS drops the connection 54. It is common for this type of failure to occur during the time that a MS promotes a pilot to the candidate set and needs to send a PSMM, or after a MS has sent a PSMM but before receiving a handoff direction message.

Layer 2 Acknowledgment Failures and Forward Link Fade Failures may occur because of excessively high frame error rates or bursty error rates. As illustrated in FIG. 7, a channel 58 may be broken up into slots 60, or superframes, typically of 80 millisecond duration. Each slot may be divided into three phases 62. These phases are numbered: 0, 1 and 2. Overlapping on top of the phases are four frames 64. These four frames are aligned with the three phases at the superframe boundaries. Each frame 64 is therefore typically 20 milliseconds long. Other frame sizes such as 5 ms, 10 ms and multiples of 20 ms can also be used. Preambles with various lengths can be transmitted prior to the data frames, for example, in case of reverse access channels and reverse common control channels. It should be understood that the content of the frames 64 can differ. One frame may contain pilot, signaling and data multiplexed on different code channels, another may contain only signaling, and yet another may contain only data. Each frame 64 may also have a different data rate, which can be changed on a frame-by-frame basis. In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate. The network capacity can be increased as the interference is reduced.

In a practical communications network, it is neither realistic nor desirable to target an error rate of zero percent (i.e., all frames received properly). Rather, a frame error rate of one percent, for example, is targeted. Power control loops can be used to maintain a desirable frame error rate. In this example, if the frame error rate rises above one percent, then the power control loop might increase the power of signals transmitted by the MS so that the frame error rate decreases to approximately one percent. On the other hand, if the frame error rate is less than one percent, the power control loop may reduce transmitted power to save power, reduce interference, and allow the frame error rate to move up to one percent. The BS may therefore continuously instruct the MS, through power control bits in predetermined locations within a frame, to transmit at various power levels to maintain an error rate of approximately one percent as the MS moves around in a particular area, or other types of interferences begin or end. The MS typically abides by the power levels that are being recommended to it by the BS. In addition, the BS can also change its transmitter power for a particular channel, through similar power control loops. Thus, both the BS and the MS may continuously provide each other feedback in order to change the other's power levels. However, depending on its resource management such as channel power allocation limits, the BS may not necessarily change its transmitter power levels based on the feedback from the MS.

Despite the aforementioned power control loop, error rates may not be controllable to about one percent as a MS, which has limited transmitter power, moves about in a cellular network and experiences variations in signal strength and signal quality due to physical impediments, interference from adjacent channels, and positions near the edges of sectors. As the error rates rise to intolerable levels, dropped connections become a problem.

Rescue Procedures

Rescue procedures based on the reverse link or restarting the connection have previously been proposed. Generally, a rescue of a failing connection is possible if there is a sector (pilot) that would be capable of sustaining the connection if the failing MS had that pilot in its active set. Rescue procedures attempt to add these missing pilots to the MS and network active sets. Essentially, the MS adds pilots autonomously to its active set and, in the case of reverse-link initiated rescues, uses the updated active set to transmit a reverse rescue channel that is typically reserved (dedicated) and pre-arranged in advance. The network may also update its active set and transmit a forward rescue channel, also pre-arranged in advance so that the MS is able to detect such transmission. Typically, a channel assignment or handoff message may be used to complete the rescue by formally assigning the MS to a new active set that is synchronized with the network's active set.

Reverse-link-based rescue methodologies include common and dedicated channel methods. In a typical reverse based rescue procedure, the MS transmits a rescue channel, either on a common or dedicated channel, while the communications network utilizes one or more sectors in an attempt to demodulate the rescue channel.

Forward based rescue procedures have also been proposed. One such forward based rescue procedure is disclosed in U.S. application Ser. No. 09/978,974 entitled "Forward Link Based Rescue Channel Method and Apparatus for Telecommunication Systems," filed Oct. 16, 2001, which describes methods and apparatus for preventing loss of signal and dropped connections between a MS and the infrastructure in a telecommunications network. A connection as referred to herein includes, but is not limited to, voice, multimedia video and audio streaming, packet switched data and circuit switched data connections, short message sequences or data bursts, and paging. The procedure, which will be generally referred to herein as the Forward Rescue Procedure (FRP), allows systems to recover from failures at the MS or BS that would otherwise result in dropped connections. Examples of failure scenarios that can be overcome using the FRP include forward link Layer 2 (L2) acknowledgement failures and loss of forward link signal due to a fade that causes loss of signal frames for a period of time exceeding a threshold value. In response to a potential connection drop situation, a MS will autonomously add BS pilot channels to the active set of its rake receiver in order to rescue the connection in danger of dropping. Concurrently, the network infrastructure will initiate transmission on alternative forward link channels that are likely to be monitored by the MS during an FRP. If the same channels are monitored by the MS and transmitted on by the infrastructure, the connection in danger of dropping can be rescued.

The general FRP includes a MS FRP, and may also include an infrastructure FRP. FIG. 8 illustrates an example of the timeline of the MS FRP and infrastructure FRP in a typical connection rescue. Although the MS FRP is central to any rescue, the infrastructure FRP, although recommended, is not strictly necessary.

Triggering of the MS FRP depends upon the type of failure that occurs. In the case of a Layer 2 failure, the FRP is activated upon a number of failed retransmissions of a message requiring acknowledgments. In the case of a Forward Link Fade Failure, the FRP is activated if there exists a loss of signal for a period of time exceeding a threshold value (see reference character 72).

The MS starts an FRP timer at the time the rescue attempt is started (see reference character 74). If the FRP timer expires before the rescue is complete, then the connection is dropped. In addition, at the time the rescue attempt is started, the MS turns off its transmitter and selects a new active set (see reference character 74). In this embodiment, the MS effectively assumes a handoff direction based on the PSMM(s) that it has sent (whether or not the PSMM was actually sent, successfully sent, or acknowledged). In other words, the MS promotes pilots to the active set autonomously without a handoff direction (i.e. the new active set is the union of the old active set and the autonomously promoted active pilots: S"=S U S') (see reference character 76). The MS then begins to cycle through this new active set searching for a rescue channel. As noted above, although the term rescue channel encompasses the various schemes for defining channels as utilized by the various communication protocols, for purposes of simplifying the disclosure, a rescue channel will herein be identified as an Assumed Code Channel (ACC) (see reference character 78).

As noted above, the infrastructure FRP, although recommended, is not strictly necessary for every BS in the network. If the infrastructure FRP is implemented (see reference character 80), the infrastructure (network) selects sectors from which it will transmit the ACC.

In one embodiment of the FRP, null (blank) data is transmitted over the ACC during rescue. In other embodiments, data may be communicated over the ACC, although a MS would only hear this data if it actually finds and successfully demodulates that ACC.

At some point in time, the MS will find and demodulate $N_{3M}$ good frames of the ACC (see reference character 82), turn on its transmitter, and begins to transmit back to the BS. Once both the MS and BS receive a predetermined number of good frames, the rescue is completed (see reference character 84) and the BS may re-assign the MS to more permanent channels. Additionally, the network may re-assign the ACCs via overheads, for example. The BSs may also re-assign the MS active set to clean up after the rescue by sending a Rescue Completion Handoff message 86 which can re-use any existing handoff messages such as General or Universal Handoff Direction messages. For additional detail on the forward based rescue procedure, see U.S. application Ser. No. 09/978,974 entitled "Forward Link Based Rescue Channel Method and Apparatus for Telecommunication Systems," filed Oct. 16, 2001.

As described above, a rescue of a failing connection is possible if there is a sector (pilot) that would be capable of sustaining the connection if the failing MS had that pilot in its active set. Therefore, some rescue procedures measure pilot signal strengths and add stronger pilots to the MS and network active sets while removing weaker pilots, using a process similar to that used for soft handoffs described above, before authorization from a BS is received. However, the process of adding stronger pilots to the MS and network active sets and removing weaker pilots through the dynamic active set modification procedure described above with regard to soft handoffs may not always result in a rescue, or may result in inefficient rescues. These problems may occur because during a failure condition, pilot signal strengths of pilot signals from the sectors in the current active set may be degraded rapidly, and become much lower than a typical value in the ideal condition (e.g., a channel without serious fading). The latter is the usual reference case for setting the parameters T_ADD_H and T_DROP_H. Thus, the T_ADD_H and T_DROP_H thresholds used for normal handoffs may be set too high for the conditions that exist when a connection is in danger of being dropped.

Nevertheless, even though a strong or dominant pilot signal is not available, it may still be possible to continue the connection through soft handoff with a larger number of BS sectors even though individual pilot signals may be weaker in strength. Therefore, a need exists to enable the MS to set and adjust rescue thresholds T_ADD_R and T_DROP_R and select and add BSs (sectors) with sufficient forward link quality into their active sets and drop BSs (sectors) with poorer forward link quality during a call recovery procedure to recover an active connection before it is dropped.

SUMMARY OF THE INVENTION

Embodiments of the present invention allow the MS to dynamically adjust the T_ADD_R and T_DROP_R pilot signal strength thresholds used to add or drop pilots from the MS's active set during rescue. Dynamic adjustment of T_ADD_R and T_DROP_R allows the MS to select and add BSs (sectors) with sufficient forward link quality into their active sets and drop BSs (sectors) with poorer forward link quality during a call recovery procedure to recover an active connection before it is dropped.

Other embodiments of the present invention improve the effectiveness of recovering an active connection through corresponding actions at the BS. When a connection drop condition is detected, the BS and MS have basically lost their communication link. Thus, the BSC may not know which BSs (sectors) have been selected by the MS and promoted into an updated active set for the purpose of recovering the connection. In one embodiment of the present invention, the BS detects the strength of the pilot signal transmitted by the MS, in case the latter has the capability of transmitting a pilot signal in the reverse link. The BS may then use these signal strength measurements to update its own active set.

These and other features and advantages of embodiments of the present invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may reference the CDMA communication protocol (code-based protocols) for purposes of explanation only, embodiments of the present invention are applicable to other communication protocols and digital radio technologies generally, and include, but are not limited to, CDMA, TDMA, FDMA, GSM, GPRS, and the like.

Embodiments of the present invention allow the MS to set and adjust rescue thresholds T_ADD_R and T_DROP_R (established by pilot $E_c/I_o$ values) and select and add BSs (sectors) with sufficient forward link quality into their active sets and drop BSs (sectors) with poorer forward link quality during a call recovery procedure to recover an active connection before it is dropped. Pilot $E_c/I_o$ values represent the ratio of the average energy per PN chip for the Pilot Channel to the total signal and interference power spectral density received by a MS, and are an indication of pilot signal strength.

Figure 1:
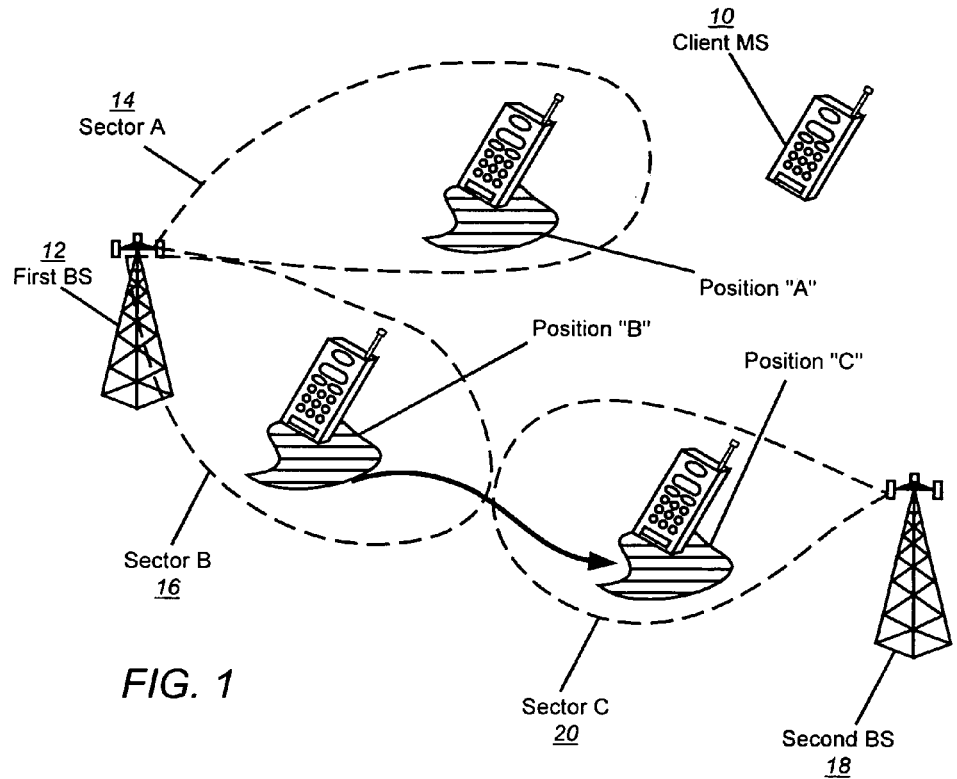
FIG. 1 illustrates a roving mobile station moving amongst different locations between sectors in a wireless communication system.
Figure 2:
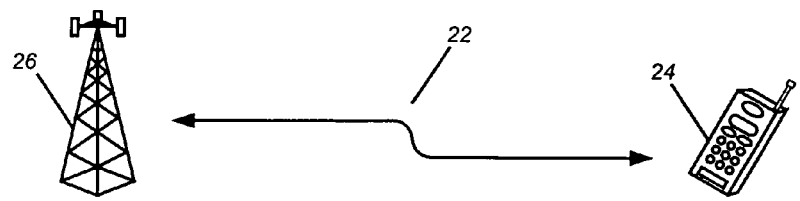
FIG. 2 illustrates an exemplary communication link between a mobile station and a base station in a wireless communication system.
Figure 3:
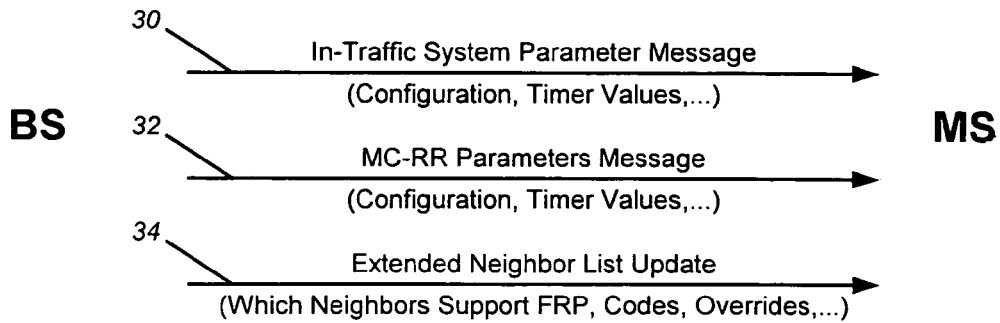
FIG. 3 illustrates overhead messages communicated from a base station to a mobile station in a wireless communication system.
Figure 5:
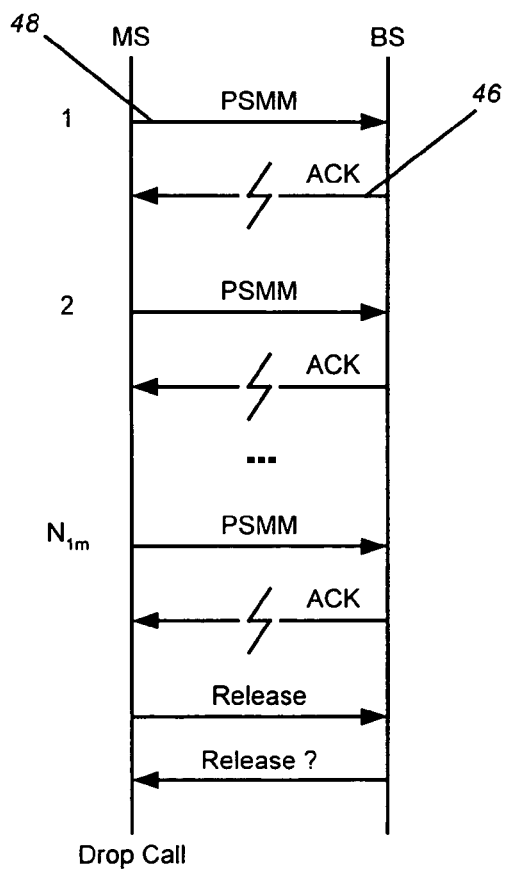
FIG. 5 is a message sequence between a mobile station and a base station resulting in a dropped connection due to Layer 2 Acknowledgement failure.
Figure 4:
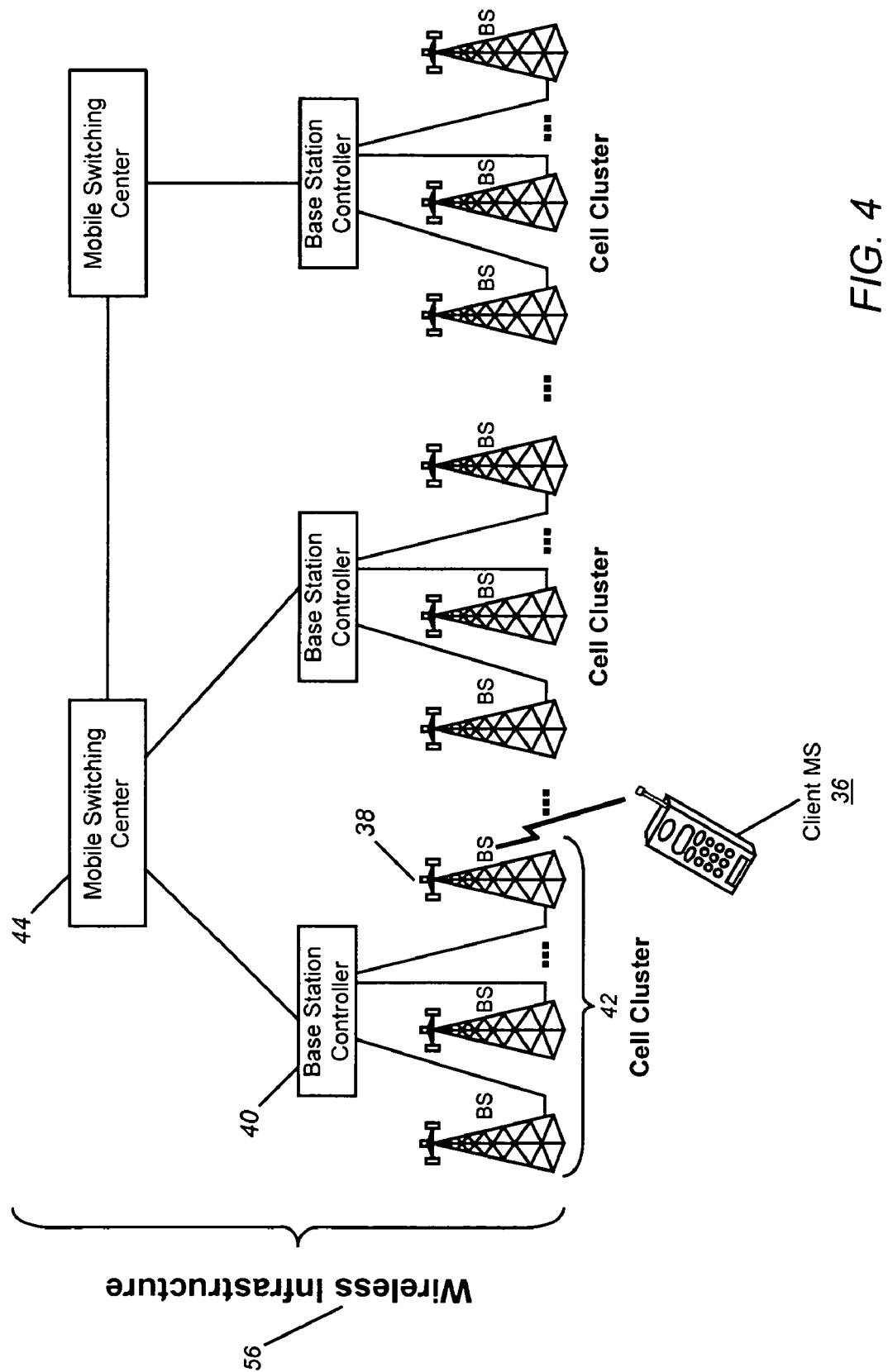
FIG. 4 illustrates a wireless communication infrastructure in communication with a roving mobile station.
Figure 6:
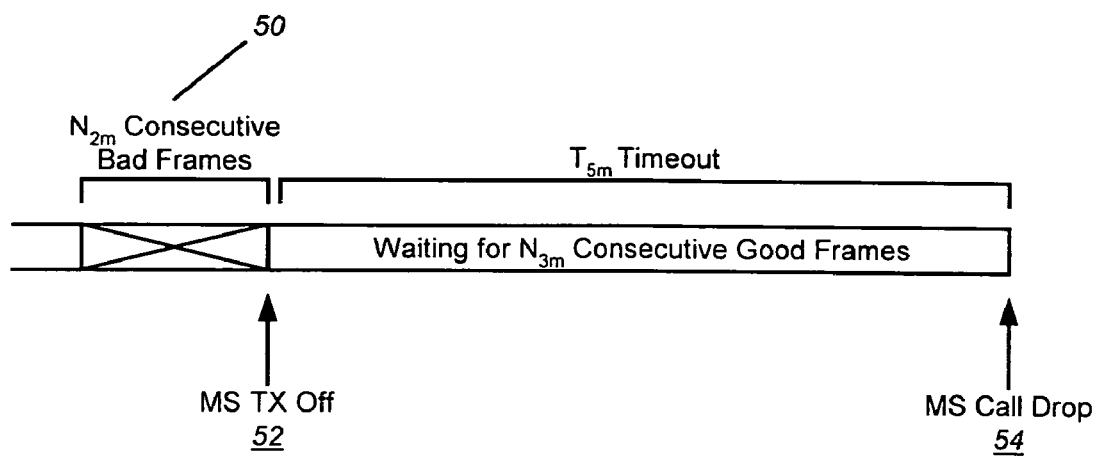
FIG. 6 is a timeline that is representative of a dropped connection resulting from fading of the forward link in a wireless telecommunications network.
Figure 7:
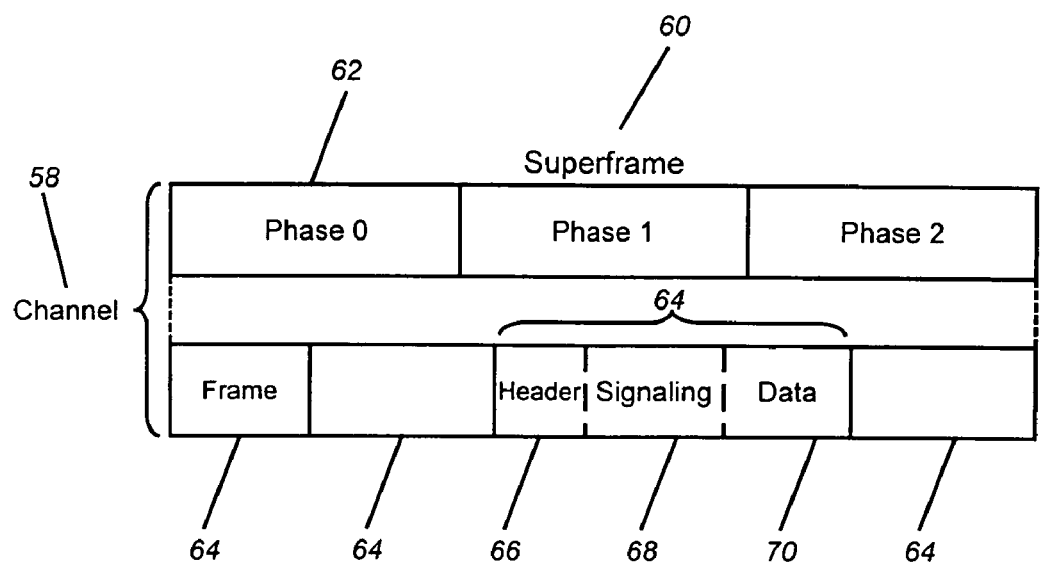
FIG. 7 is a timeline of a superframe, divided into three phases and four frames, for use in a wireless telecommunications network.
Figure 8:
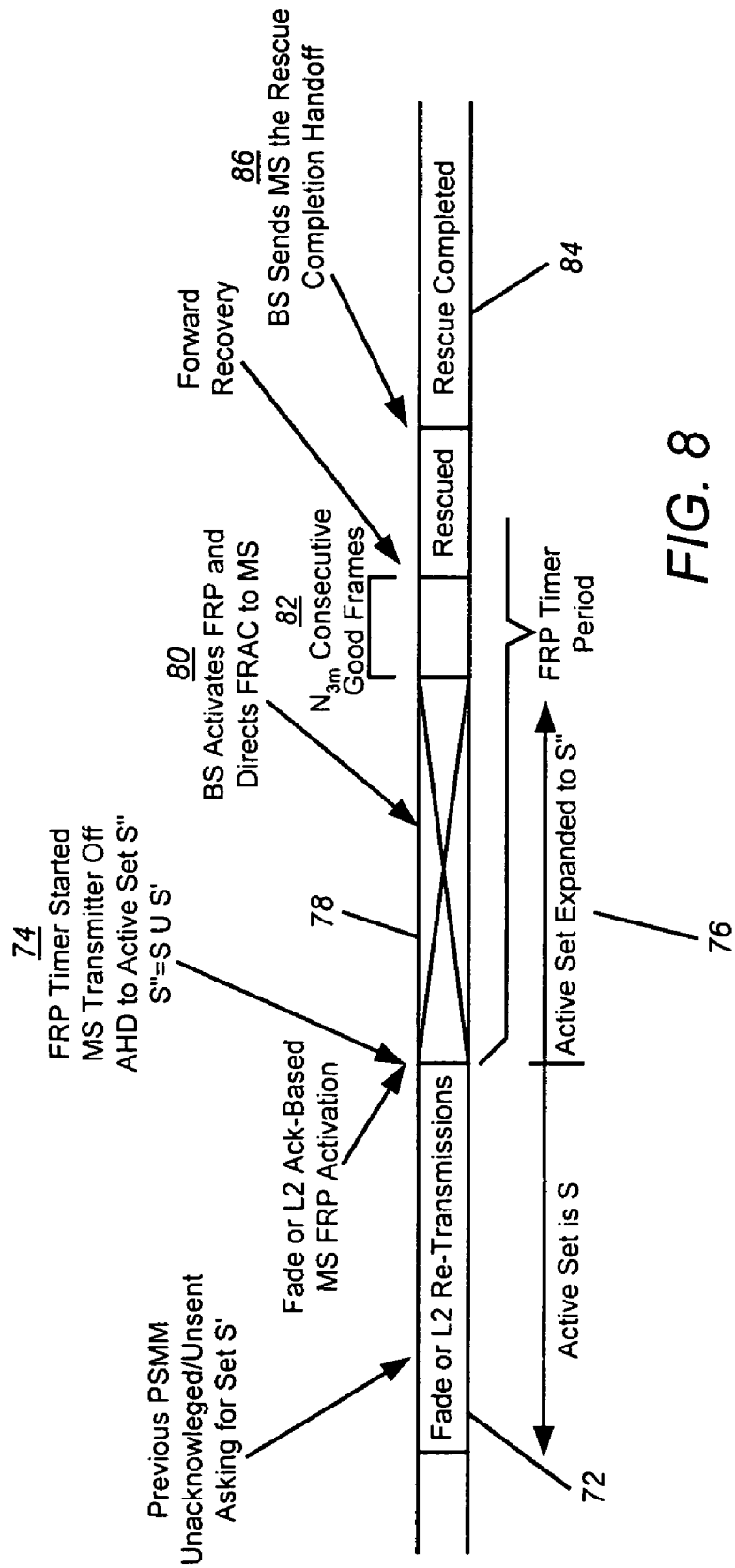
FIG. 8 is a timeline of one embodiment of the Forward Rescue Procedure when it is activated.
Figure 9:
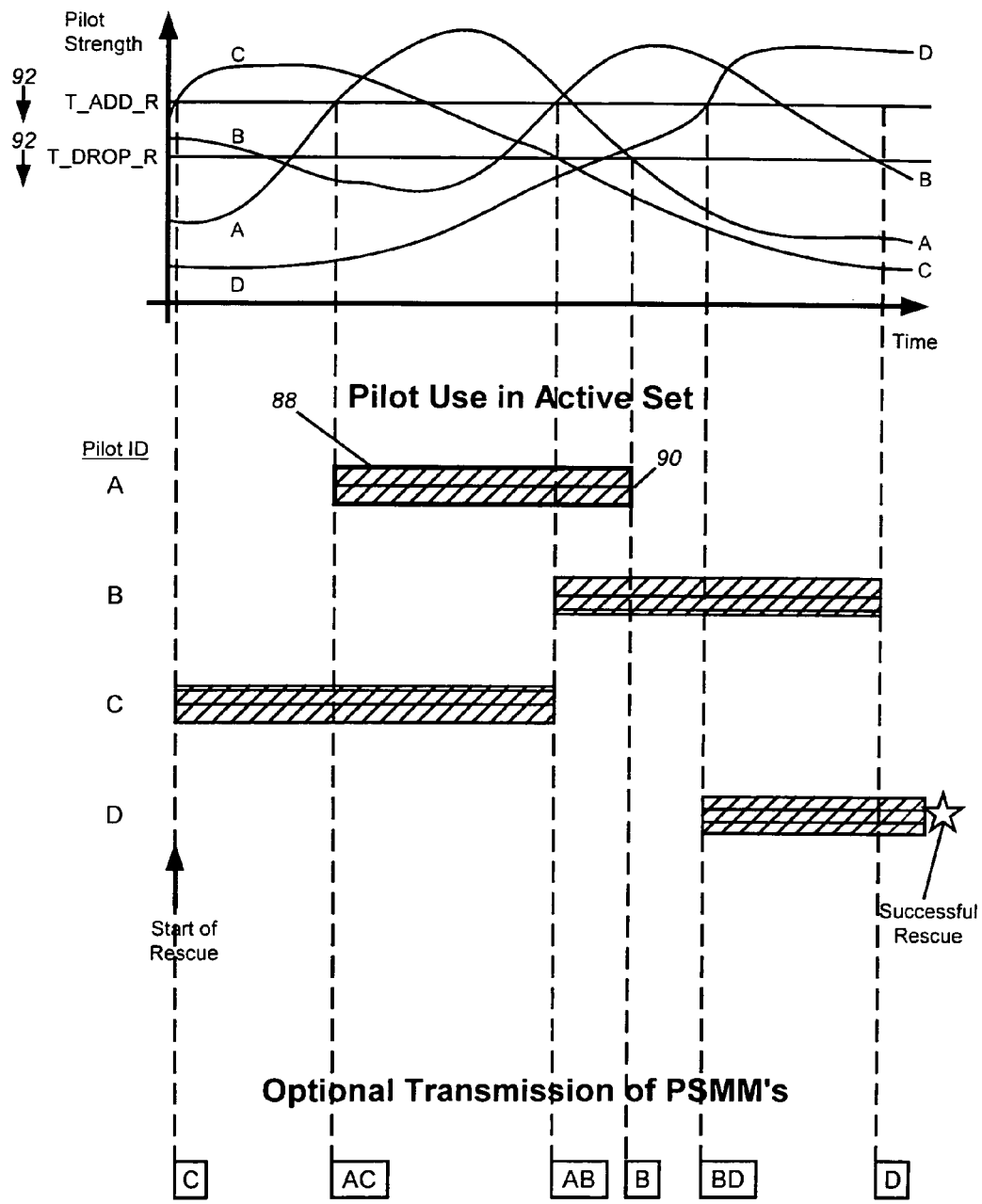
FIG. 9 is a diagram illustrating the general concepts of adding and dropping pilots from the MS active set during rescue, and how adjustment of T_ADD_R and T_DROP_R can affect the number and quality of pilots in the updated active set according to an embodiment of the present invention.

FIG. 9 illustrates the general concepts of adding and dropping pilots from the MS active set during rescue, and how adjustment of T_ADD_R and T_DROP_R can affect the number and quality of pilots in the updated active set. In the example of FIG. 9, as part of a rescue procedure, a MS autonomously monitors pilot signals A, B, C and D for their signal strength. When a pilot achieves signal strength that is above the threshold T_ADD_R, the MS will autonomously promote that pilot to both the candidate set and the active set (see, e.g., reference character 88). Similarly, When a pilot achieves signal strength that is below the threshold T_ADD_R, the MS will autonomously demote that pilot from the candidate set and the active set (see, e.g., reference character 90). There may be a time delay associated with each addition and deletion of BSs from the active set. For example, based on TIA/EIA/IS-2000, the MS can delete a BS from the active set after its pilot has degraded below T_DROP_R for a duration exceeding pilot drop timer T_T_DROP. If the WCDMA standard is used, a time delay equal to the parameter (Δt) "Time to Trigger" has to be satisfied for both addition and deletion of BSs to and from the active set, as described in 3GPP TR 25.922. As can be inferred from FIG. 9, lowering T_ADD_R and T_DROP_R (see reference character 92) serves the purpose of possibly adding pilots to the new active set that otherwise would not have qualified, adding pilots to the new active set sooner than they would have otherwise, and keeping pilots in the new active set longer than they would have otherwise. Raising T_ADD_R and T_DROP_R would have the opposite effect.

Figure 10:
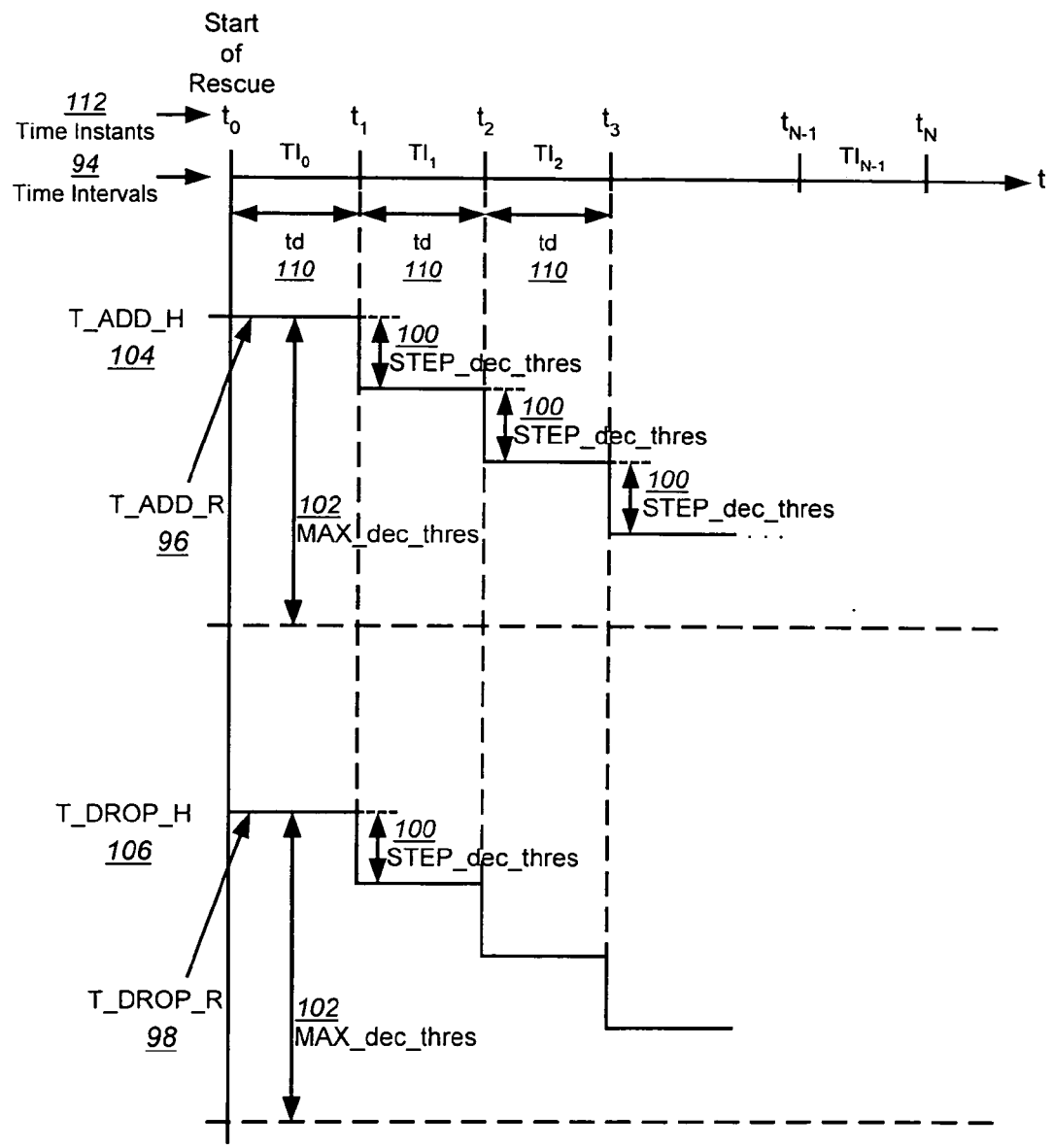
FIG. 10 illustrates the parameters involved in the adjustment of T_ADD_R and T_DROP_R according to embodiments of the present invention.

FIG. 10 illustrates the parameters involved in the adjustment of T_ADD_R 96 and T_DROP_R 98 according to embodiments of the present invention. As shown in the example of FIG. 10, the adjusted values for T_ADD_R and T_DROP_R during any time interval $TI_N$, N=0, 1, 2 . . . M (see reference character 94) for the purpose of connection recovery can be computed as follows:

$$T\_ADD\_R = T\_ADD\_H - \min(STEP\_dec\_thres*N, MAX\_dec\_thres) \text{ and}$$

$$T\_DROP\_R = T\_DROP\_H - \min(STEP\_dec\_thres*N, MAX\_dec\_thres),$$

where

STEP_dec_thres 100–decrement change in the threshold values T_ADD_R and T_DROP_R at each successive time interval $TI_N$, N=0, 1, 2 . . . M, and MAX_dec_thres 102–maximum decrement of the initial values for T_ADD_R and T_DROP_R set at the beginning of the rescue procedure.

As the example of FIG. 10 illustrates, threshold values T_ADD_R and T_DROP_R may be decremented at each time instant $t_N$, N=1, 2, 3 . . . M (see reference character 112). It should be noted that the embodiment of the present invention illustrated in FIG. 10 and described in the equations above set the initial values for T_ADD_R and T_DROP_R at the beginning of the rescue procedure to be equal to the add and drop threshold values during handoff, T_ADD_H 104 and T_DROP_H 106. However, in other embodiments, the initial values for T_ADD_R and T_DROP_R may be set to other values, which will typically be less than T_ADD_H and T_DROP_H.

The timing of the time instants $t_N$ and the determination of STEP_dec_thres and MAX_dec_thres will be discussed in the sections that follow.

Time Instants $t_N$

Time instants $t_N$ are the times at which the thresholds T_ADD_H and T_DROP_H are to be reduced by STEP_dec_thres. As illustrated in FIG. 10, Td 110 is the time interval between successive occurrences of $t_N$. In embodiments of the present invention, Td can be a constant or a variable.

With Td as a constant, time instants $t_N$ are equally spaced at time interval Td. Td can be set to a smaller value at the beginning of a connection recovery procedure in an attempt to increase the speed of connection rescue by lowering the rescue thresholds T_ADD_R and T_DROP_R and updating the active set more frequently, or set to a larger value at the beginning of the connection recovery procedure in an attempt to minimize the interference caused by the connection rescue procedure, and to account for any delay incurred before the BS detects the condition which initiates the rescue procedure.

In case of a forward rescue procedure, the minimum value of Td ($Td_{min}$) should be long enough (provide enough dwell time) to allow the MS to acquire the new forward links, and to demodulate the combined signal based on the new active set. In case of a reverse rescue procedure, $Td_{min}$ should be long enough to allow a BS to acquire and demodulate the MS's transmission, send an acknowledgement, and for the MS to acquire, demodulate the forward link signal and decode the message. Td should also allow for any backhaul delay, which is the time needed for the BSC to inform the BS of concern to participate in the call recovery procedure. For purposes of illustration only, a typical value for $Td_{min}$ can be around 300–600 ms. It should be understood that either the MS or network may compute the Td values described above. If the network performs the computations, it may communicate the Td value to the MS in advance of the need for rescue, such as in configuration messages during connection setup, for example.

Although Td may initially be set as described above, embodiments of the present invention may then dynamically change Td for each time interval $TI_N$. As a variable, Td may decrease at each successive time interval $TI_N$ in an attempt to incrementally increase the time between lowering rescue thresholds T_ADD_R and T_DROP_R and updates to the active set and increase the speed of connection rescue, while minimizing pilot pollution. In another embodiment of the present invention, if E is the combined pilot Ec/Io for a particular active set, and E is higher than a predetermined desired combined pilot Ec/Io ($E_{desired}$), then it is probable that a rescue can be accomplished using the present active set. Td can therefore be increased, which slows the lowering of rescue thresholds T_ADD_R and T_DROP_R and the updating of the active set. In other words, If $E \geq E_{desired}$, then increase Td.

Td can also be varied in proportion to ΔE, where ΔE is the difference in the combined pilot Ec/Io of the current active set from that of the previous active set. For example, if ΔE is positive, then the new updated active set has a higher combined signal strength than the previous active set, but if ΔE is negative, then the reverse is true. In one embodiment of the present invention, because a MS with a ΔE that is the same as or greater than a predetermined threshold ζ may indicate that its updated active set contains strong pilots, and is likely to be rescued, Td can be increased because less frequent adjustment of rescue thresholds T_ADD_R and T_DROP_R may be needed. Conversely, a MS with a ΔE that is less than the predetermined threshold ζ may indicate that its updated active set contains weaker pilots, so Td can be decreased to allow for more frequent adjustments to rescue thresholds T_ADD_R and T_DROP_R.

For example, $$T_d(t)=\mu T_d(t-1),$$

where $\mu>1$, for $\Delta E(t) \geq \zeta$,
$\mu \leq 1$, for $\Delta E(t) < \zeta$;

and $T_d(t) \geq (T_d)_{min}$
and furthermore, $$\mu(t) \propto |\Delta E(t)|_{linear}$$

where $\mu$ represents a fractional change to Td, and ζ=0.5, 1, for example.

The STEP_dec_thres Value

STEP_dec_thres is the decrement change in the threshold values T_ADD_R and T_DROP_R at each time instant $t_N$, N=1, 2, 3 . . . M. In embodiments of the present invention, STEP_dec_thres can be a constant or a variable.

With STEP_dec_thres as a constant, threshold values T_ADD_R and T_DROP_R decrease by a fixed amount at each time instant $t_N$. In one embodiment, T_ADD_R and T_DROP_R are computed by first determining the number of complete rescue cycles K that could be completed before the rescue procedure timer reaches its terminal count and the connection would be dropped, represented by the integer portion of Tr/Td. In other words, $$K=\lfloor T_r/T_d \rfloor$$

Tr is the time between the start of the rescue procedure and the expected time for the connection to be dropped if the rescue procedure is unsuccessful and a rescue timer reaches its terminal count, and Td is a constant representing the time between each updating of the rescue active set (i.e., the time needed for the MS to acquire forward link transmission) in the case of a forward rescue procedure, or the time needed for a BS to acquire the reverse link and the MS to acquire the forward link in the case of a reverse rescue procedure. Then, STEP_dec_thres=(T_ADD_H−MAX_dec_thres)/(K−1), Where T_ADD_H is the pilot add threshold specified by the base station for normal soft handoff procedure, or any other initial value for T_ADD_R at the beginning of the rescue procedure.

STEP_dec_thres can also be set to a larger value in an attempt to quickly expand the updated active set and increase the speed of connection rescue.

In another embodiment of the present invention, STEP_dec_thres may be a variable, increasing with rescue time. Thus, for example, STEP_dec_thres=δ,2δ, . . . , (K−1)δ for $t_N$, N=1, 2, . . . (K−1), respectively, where K is the number of complete rescue cycles that could be completed before the rescue procedure timer reaches its terminal count and the connection would be dropped. In addition, the sum of all the STEP_dec_thres values must not be greater than MAX_dec_thres, such that $$\Rightarrow [1 + 2 + \ldots + (K-1)] \cdot \delta = \text{MAX\_dec\_thres}$$
$$\Rightarrow \delta = \frac{2(\text{MAX\_dec\_thres})}{(K-1)K}$$

It should be understood that either the MS or network may compute the STEP_dec_thres values described above. If the network performs the computations, it may communicate the STEP_dec_thres value to the MS in advance of the need for rescue, such as in configuration messages during connection setup, for example.

As previously defined, ΔE is the difference in the combined pilot Ec/Io of the current active set from that of the previous active set. In yet another embodiment of the present invention, if ΔE is greater than a predetermined threshold, this is an indication that the current set of pilots in the active set are better (stronger) than the pilots in the previous active set, and therefore STEP_dec_thres could be decreased. However, if ΔE is less than or equal to the predetermined threshold, this is an indication that the current set of pilots in the active set are worse (weaker) than the pilots in the previous active set, and therefore STEP_dec_thres may be increased or at least kept the same. In other words, STEP_dec_thres may be a variable, inversely proportional to ΔE. Therefore, in embodiments of the present invention, STEP_dec_thres$(t)$=ϵ[STEP_dec_thres$(t-1)$], where ϵ<1 if $\Delta E(t) > \zeta dB$, and ϵ≥1 if $\Delta E(t) \leq \zeta dB$, and furthermore, $$\varepsilon(t) \propto \frac{1}{[\Delta E(t)]_{linear}},$$

where ϵ represents a fractional change to STEP_dec_thres, and ζ=0.5, 1, for example.

Either one or a combination of the above methods can be used to determine STEP_dec_thres.

The MAX_dec_thres Value

MAX_dec_thres is the maximum decrement of the initial values for T_ADD_R and T_DROP_R set at the beginning of the rescue procedure. The value of MAX_dec_thres can be decreased if it is desirable to keep the interference level lower. In other words, a smaller value for MAX_dec_thres generally results in a smaller active set.

In one embodiment of the present invention, to determine MAX_dec_thres, the desired combined pilot Ec/Io ((Ec/Io)$_{desired}$) must be predetermined or chosen to give a high probability of producing a good link. As shown in TIA/EIA-98D-, pilot Ec/Io is proportional to two quantities, the pilot Ec/Ior, wherein Ec/Ior is the ratio of the average energy per PN chip of the pilot channel to the total transmitted power spectral density, and the geometry of the MS, which is the ratio of the received power spectral density of a forward CDMA channel to the power spectral density of noise and interference, if the geometry is much smaller than one (typical condition for a connection failure). Thus, if MS has knowledge on its geometry, the pilot (Ec/Io)$_{desired}$ can be estimated by the MS. On the other hand, the traffic channel power required to sustain a certain link quality (usually indicated by frame error rate) at the MS is inversely proportional to the geometry. A worse case geometry may be estimated based on some knowledge that the MS may have regarding the available traffic channel power. Pilot (Ec/Io)$_{desired}$ can thus be computed. In addition, Ec/Io for the strongest pilot in the current active set ((Ec/Io)$_{max}$) can be measured or estimated, under the assumption that the following equation is satisfied:

$$\left(\frac{E_c}{I_o}\right)_{max} < \left(\frac{E_c}{I_o}\right)_{desired}.$$

If N is the maximum allowed active set size, then in the linear domain, $$\left(\frac{E_c}{I_o}\right)_{max} + (N-1)\left(\frac{E_c}{I_o}\right)_{min} \geq \left(\frac{E_c}{I_o}\right)_{desired}$$

where (N−1)(Ec/Io)$_{min}$ represents the total combined energies of all pilots in the current active set besides the strongest pilot (Ec/Io)$_{max}$). Once (N−1)(Ec/Io)$_{min}$ is determined using the above equation, MAX_dec_thres can be computed as:

For example, if $$\left(\frac{E_c}{I_o}\right)_{max} = -12.5 \text{ dB}, \left(\frac{E_c}{I_o}\right)_{desired} = -12 \text{ dB}, N = 6, \text{T\_ADD} = -15 \text{ dB}$$

$$\Rightarrow \left(\frac{E_c}{I_o}\right)_{min} \geq -28.6 \text{ dB}$$

$$\Rightarrow \text{MAX\_dec\_thres} = 13.6 \text{ dB}$$

Notwithstanding the above, the parameters STEP_dec_thres and MAX_dec_thres should be set such that the resulting size of the updated MS active set is within allowable limits.

It should be understood that either the MS or network may compute the MAX_dec_thres values described above. If the network performs the computations, it may communicate the MAX_dec_thres value to the MS in advance of the need for rescue, such as in configuration messages during connection setup, for example.

Other Embodiments

In the TIA/EIA/IS-2000-5 Standard incorporated by reference hereinabove, "add threshold" and "drop threshold" algorithms are presented in Sections 2.6.6.2.5.2 and 2.6.6.2.3, respectively, for increasing thresholds used for adding or dropping pilots from a MS active set used for handoff purposes. Increasing the thresholds makes it more difficult to add pilots to the MS active set. In the "add threshold" and "drop threshold" algorithms, the maximum of either a static threshold value and a dynamically computed threshold value is selected as the new threshold value. In one embodiment of the present invention, these algorithms are modified and used for decreasing thresholds used for adding or dropping pilots from a MS active set used for rescue purposes by replacing the static threshold value with T_ADD_R and T_DROP_R described above.

In another embodiment of the present invention, the active set includes BSs (sectors) that have the highest pilot $E_c/I_o$ measurement values. When a rescue condition is detected at the MS, the MS can scan through all detectable pilot signals and rank them in decreasing order of strength. As the pilot and traffic channels usually fade together, the combined forward link traffic $E_b/N_t$ (signal-to-noise ratio) can be assumed to be proportional to the combined $E_c/I_o$ of pilot signals in the active set, assuming the BSs (sectors) have not reached their capacity limits. The sector with the strongest pilot signal is first added to the active set. Each sector may then be added according to its position in the ranked list of pilot strengths, if its addition to the active set can increase the combined $E_c/I_o$ of the pilot signals already in the active set by a predetermined percentage, or certain criteria are met. Using the previous example, if there exists one strong pilot and the next (N−1) weaker pilots have Ec/Io values which exceed or are equal to (Ec/Io)$_{min}$, some or all of the (N−1) pilots can be included into the active set. Another method is to start with a number of strong pilots such that their combined pilot Ec/Io is smaller than pilot (Ec/Io)$_{desired}$ by γ dB. If the connection cannot be rescued using this active set, the pilot Ec/Io can be measured and re-ranked in the next rescue cycle, and γ can also be decreased. In other words, as pilot (Ec/Io)$_{desired}$ is an estimation that serves as an indicator that the link quality is sufficient with a high probability, it may still be possible for the connection to be rescued by a small active set with a combined pilot (Ec/Io) less than pilot (Ec/Io)$_{desired}$ by γ dB. If the rescue based on this active set is not successful, more pilots can be added such that γ is decreased. Yet another method would be to add pilots from the ranked list, in order of decreasing pilot signal strength, until the combined pilot Ec/Io equals or exceeds (Ec/Io)$_{desired}$.

One of the causes of connection drop is due to the loss of forward link signal from the serving BS in the current active set, based on the observation of some field measurement data. Thus, it would be desirable for the MS to search for the strongest pilot signals and add them to the active set. As a result, a forward link traffic channel with better quality can be obtained through maximal ratio combining receiver.

Although the method of adding pilots according to a signal-strength ranked list described above is optimal for improving forward link quality, the corresponding reverse link qualities may not be optimal, as the channel fading conditions in the forward and reverse links are not necessarily correlated.

In the reverse link, the BS would have to find some possibly good links to the MS awaiting rescue. In one embodiment of the present invention, each MS transmits a uniform energy signal in the reverse link. This uniform energy signal may be a reverse link pilot signal or a data signal at a predetermined data rate with predetermine data. When a rescue condition is detected, a BS in the neighborhood of the MS awaiting rescue can measure the strength of the uniform energy signal transmitted from the MS. If the measured uniform energy signal strength exceeds a threshold, the BS can include itself in the rescue active set and start transmissions to the MS. Otherwise, the BS would not participate in the rescue action for this particular MS. This can ensure that the final active set contains sectors that have sufficiently good link qualities in the forward and reverse directions. At the same time, unnecessary interference can be minimized.

Other embodiments of the present invention improve the effectiveness of recovering an active connection through corresponding actions at the BS. When a connection drop condition is detected, the BS and MS have basically lost their communication link. Thus, the BS may not know which other BSs (sectors) have been selected by the MS and promoted into the MS's active set for the purpose of recovering the connection.

In one embodiment of the present invention, the BS can update its own active set using different methodologies. The BS may be able to detect the strength of a pilot signal transmitted by the MS, if the MS has the capability of transmitting a pilot signal in the reverse link. The MS may be able to transmit a PSMM containing pilot strength information of pilots in its new active set. The BS may use the last known active set or previous active sets for that MS, the location of the MS, the sectors closest to the MS, or other historical information specific to that MS, such as what new pilots the MS had previously asked for. The BS may then use the signal strength measurements, active set information, and other pilot information to update its own active set for use in generating a forward rescue channel. In another embodiment, in order for the connection to be recovered, the BSC can instruct a number of BSs that are in the vicinity of the MS in danger of failing to participate in the recovery procedure. Based on the location of the MS and the knowledge of the network planning information that is available to the BSC, there may be a high probability of a sufficient match in the active sets between the network and the MS.

Procedure Summary

Figure 11:
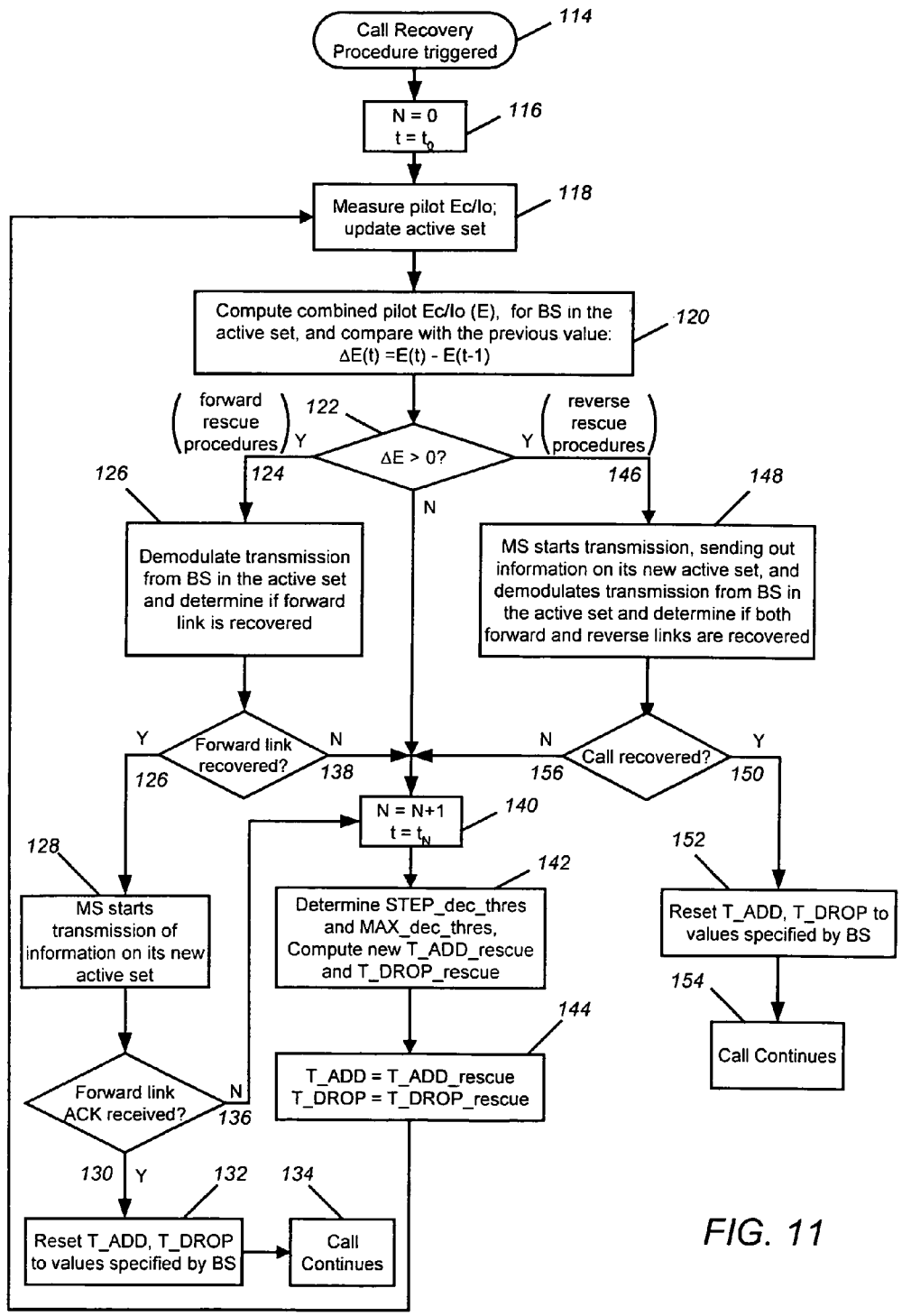
FIG. 11 is a flowchart illustrating the procedure for adjusting T_ADD_R and T_DROP_R and adding and dropping pilots from the MS active set during a rescue procedure according to an embodiment of the present invention.

FIG. 11 is a flowchart illustrating a summary of an example procedure for adjusting T_ADD_R and T_DROP_R and adding and dropping pilots from the MS active set during a rescue procedure, utilizing embodiments of the present invention described above. When a rescue procedure is started 114, a rescue timer is started at time t=0 (see reference character 116). In block 118, the Ec/Io values for pilots in the current active set are measured, and pilots are added to or dropped from the updated active set using the current rescue thresholds T_ADD_R and T_DROP_R, as constrained by the maximum allowable active set size. Note that the MS acts autonomously at this point, without the need for BS authorization. In block 120, the combined pilot Ec/Io value (E) is computed for all pilots in the updated active set, and is compared to the previous E value.

If ΔE is greater than zero (see reference character 122) and a forward rescue procedure is being implemented (see reference character 124), in block 126 the MS then attempts to demodulate rescue channel transmissions from the BSs in the updated active set, and determines if the forward link is recovered. Td represents the dwell time during this process. If the forward link is recovered (see reference character 126), then in block 128 the MS begins transmits its regular connection information to BSs in its new active set. If the MS receives an acknowledgement message from one or more BSs (see reference character 130), the MS resets T_ADD_R and T_DROP_R to the initial values specified by the network in block 132, and the connection continues in block 134.

If the MS does not receive an acknowledgement message (see reference character 136), or if the forward link is not recovered by the MS (see reference character 138), then at the next time instant (see reference character 140), STEP_dec_thres, MAX_dec_thres, T_ADD_R and T_DROP_R are computed (see reference characters 142 and 144) as described above, and a new rescue cycle begins at block 118.

If ΔE is greater than zero (see reference character 122) and a reverse rescue procedure is being implemented (see reference character 146), then in block 148 the MS transmits a reverse rescue channel to BS sectors in its updated active set, attempts to demodulate rescue channel transmissions from the BSs in the updated active set, and determines if both the forward and reverse links are recovered. Td represents the dwell time during this process. If both the forward and reverse links are recovered (see reference character 150), the MS resets T_ADD_R and T_DROP_R to the initial values specified by the network in block 152, and the connection continues in block 154. If the connection is not recovered (see reference character 156), then at the next time instant 140, STEP_dec_thres, MAX_dec_thres, T_ADD_R and T_DROP_R are computed (see reference characters 142 and 144) as described above, and a new rescue cycle begins at block 118.

Although the dynamic active set concepts described hereinabove used a cellular network as an example, the basic concept of dynamically selecting threshold criteria for generating active sets during rescue are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, a wireless terminal device, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:

incrementally lowering T_ADD_R and T_DROP_R by an amount STEP_dec_thres at one or more specific time instants $t_N$, N=1, 2, . . . M during the rescue procedure, each time instant separated by a time Td.

2. The method as recited in claim 1, further including lowering T_ADD_R and T_DROP_R in accordance with pilot signal strengths (Ec/Io values) measured at the MS.

3. The method as recited in claim 2, further including increasing Td between one or more time instants $T_N$ if a combined pilot Ec/Io for the updated active set of the MS is higher than a predetermined desired combined pilot Ec/Io.

4. The method as recited in claim 1, further including lowering T_ADD_R and T_DROP_R by not more than a total amount MAX_dec_thres during the rescue procedure.

5. The method as recited in claim 1, further including incrementally adjusting Td between time instants $T_N$.

6. The method as recited in claim 1, further including incrementally adjusting STEP_dec_thres at one or more time instants $T_N$.

7. The method as recited in claim 1, the method for additionally determining an updated active set of pilots for use by the network in the rescue procedure, the method further comprising:
   transmitting a uniform energy signal from the MS having the potentially failing connection; and
   for each of one or more BSs in a neighborhood of the MS, measuring a strength of the uniform energy signal, and adding the BS to the updated active set used by the network if the strength of the uniform energy signal for that BS is above a predetermined threshold.

8. The method as recited in claim 1, the method for additionally determining an updated active set of pilots for use by the network in the rescue procedure, the method further comprising:
   for each of one or more BSs in a neighborhood of the MS, adding the BS to the updated active set used by the network in accordance with a location of the MS and network planning information.

9. The method as recited in claim 1, the MS capable of transmitting a uniform energy signal, the method for additionally determining an updated active set of pilots for use by the network in the rescue procedure, the method further comprising:
   for each of one or more BSs in a neighborhood of the MS, measuring a strength of the uniform energy signal, and adding the BS to the updated active set used by the network if the strength of the uniform energy signal for that BS is above a predetermined threshold.

10. The method as recited in claim 9, wherein the uniform energy signal is a reverse link pilot signal.

11. The method as recited in claim 9, wherein the uniform energy signal is a data signal at a predetermined data rate with predetermined data.

12. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:
   incrementally lowering T_ADD_R and T_DROP_R by an amount STEP_dec_thres at one or more specific time instants $t_N$, N=1, 2, ... M during the rescue procedure, each time instant separated by a time Td;
   lowering T_ADD_R and T_DROP_R in accordance with pilot signal strengths (Ec/Io values) measured at the MS;
   increasing Td between one or more time instants $T_N$ if a difference between a combined pilot Ec/Io for the updated active set of the MS and the combined pilot Ec/Io for a previous updated active set of the MS is larger than a predetermined threshold; and
   decreasing Td between one or more time instants $T_N$ if the difference between the E for the updated active set of the MS and the E for a previous updated active set of the MS is smaller than the predetermined threshold.

13. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:
   incrementally lowering T_ADD_R and T_DROP_R by an amount STEP_dec_thres at one or more specific time instants $t_N$, N=1, 2, ... M during the rescue procedure, each time instant separated by a time Td;
   incrementally adjusting STEP_dec_thres at one or more time instants $T_N$; and
   adjusting STEP_dec_thres at each time instant $T_N$ by
      determining a number of complete rescue cycles K that could be completed before a rescue procedure timer reaches its terminal count, and
      computing (T_ADD_H−MAX dec_thres)/(K−1) as a value for STEP_dec_thres at each time instant $T_N$, wherein T_ADD_H is an initial value for T_ADD_R at the start of the rescue procedure.

14. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_used by the MS in determining an updated active set of pilots for use by the MS in the rescue procedure, the method comprising:
   incrementally lowering T_ADD_R and T_DROP_R by an amount STEP_dec_thres at one or more specific time instants $t_N$, N=1, 2, ... M during the rescue procedure, each time instant separated by a time Td;
   incrementally adjusting STEP_dec_thres at one or more time instants $T_N$; and
   increasing STEP_dec_thres at each time instant $T_N$ by
      determining a number of complete rescue cycles K that could be completed before a rescue procedure timer reaches its terminal count,
      determining δ=2*(MAX_dec_thres)/(K−1)K, where δ is an initial value for STEP_dec_thres at the start of the rescue procedure, and
      computing δ*N as a value for STEP_dec_thres at each time instant $T_N$, wherein N=1, 2, ... (K−1).

15. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:
   incrementally lowering T_ADD_R and T_DROP_R by an amount STEP_dec_thres at one or more specific time instants $t_N$, N=1, 2, ... M during the rescue procedure, each time instant separated by a time Td;
   incrementally adjusting STEP_dec_thres at one or more time instants $T_N$;
   decreasing STEP_dec_thres at one or more time instants $T_N$, N=1, 2, ... M, if a difference between a combined pilot Ec/Io for the updated active set of the MS at a particular time instant $T_N$ and the combined pilot Ec/Io for a previous updated active set of the MS at an immediately previous time iiistant $T_{N-1}$ is larger than a predetermined threshold; and increasing STEP_dec_thres at one or more time instants $T_N$, N=1, 2, . . . M, if the difference between the combined pilot Ec/Io for the updated active set of the MS at the particular time instant $T_N$ and the combined pilot Ec/Io for the previous updated active set of the MS at the immediately previous time instant $T_{N-1}$ is smaller than or equal to a predetermined threshold.

16. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:

incrementally lowering T_ADD_R and T_DROP_R by an amount STEP_dec_thres at one or more specific time instants $t_N$, N=1, 2, . . . M during the rescue procedure, each time instant separated by a time Td;

lowering T_ADD_R and T_DROP_in accordance with pilot signal strengths (Ec/Io values) measured at the MS; and determining MAX_dec_thres by selecting a desired combined pilot Ec/Io that gives a high probability of producing a good link as $(Ec/Io)_{desired}$, measuring or estimating an Ec/Io value from a strongest pilot in the updated active set as $(Ec/Io)_{max}$, solving $(Ec/Io)_{max}+(N-1)(Ec/Io)_{min} \geq (Ec/Io)_{desired}$ for $(Ec/Io)_{min}$, where N is a maximum allowed active set size, and computing MAX_dec_thres as T_ADD_R−$(Ec/Io)_{min}$.

17. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:

incrementally lowering T_ADD_R and T_DROP_R by an amount STEP_dec_thres at one or more specific time instants $t_N$, N=1, 2, . . . M during the rescue procedure, each time instant separated by a time Td;

lowering T_ADD_R and T_DROP_R in accordance with pilot signal strengths (Ec/Io values) measured at the MS;

measuring Ec/Io for all pilots detectable by the MS having the potentially failing connection;

placing the measured pilots in a list in order of decreasing Ec/Io; and starting with the pilot in the list having the highest Ec/Io and going through the list in order of decreasing Ec/Io, measuring the combined Ec/Io for all pilots in the updated active set, for a current pilot from the list, determining the combined Ec/Io for all pilots in the updated active set plus the current pilot, and adding the current pilot to the updated active set if the current pilot increased the combined Ec/Io measurement by a predetermined percentage.

18. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:

incrementally lowering T_ADD_R and T_DROP_R by an amount STEP_dec_thres at one or more specific time instants $t_N$, N=1, 2, . . . M during the rescue procedure, each time instant separated by a time Td; and determining an updated active set of pilots for use by the network in the rescue procedure by transmitting a uniform energy signal from the MS having the potentially failing connection, and for each of one or more BSs in a neighborhood of the MS, measuring a strength of the uniform energy signal, and adding the BS to the updated active set used by the network if the strength of the uniform energy signal for that BS is above a predetermined threshold;

wherein the uniform energy signal is a reverse link pilot signal.

19. In a system comprising a network and at least one mobile station (MS) for enabling communications with the at least one MS, the system capable of performing a rescue procedure for rescuing a MS for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:

incrementally lowering T_ADD_R and T_DROP_R by an amount STEP_dec_thres at one or more specific time instants $t_N$, N=1, 2, . . . M during the rescue procedure, each time instant separated by a time Td; and determining an updated active set of pilots for use by the network in the rescue procedure by transmitting a uniform energy signal from the MS, and for each of one or more BSs in a neighborhood of the MS, measuring a strength of the uniform energy signal, and adding the BS to the updated active set used by the network if the strength of the uniform energy signal for that BS is above a predetermined threshold;

wherein the uniform energy signal is a data signal at a predetermined data rate with predetermined data.

20. A mobile station (MS) for communicating with a network and for assisting in performing a rescue procedure when an acknowledgement failure has been detected, the MS comprising:

a processor programmed for incrementally lowering pilot signal strength add and drop thresholds T_ADD_R and T_DROP_R by an amount STEP_dec_thres at one or more specific time instants $t_N$, N=1, 2, . . . M during the rescue procedure, each time instant separated by a time Td;

wherein T_ADD_R and T_DROP_R are used by the MS for determining an updated active set of pilots for use in the rescue procedure.

21. The MS as recited in claim 20, the processor further programmed for lowering T_ADD_R and T_DROP_R in accordance with pilot signal strengths (Ec/Io values) measured at the MS.

22. The MS as recited in claim 21, the processor further programmed for increasing Td between one or more time instants $T_N$ if a combined pilot Ec/Io for the updated active set of the MS is higher than a predetermined desired combined pilot Ec/Io.

23. The MS as recited in claim 20, the processor further programmed for lowering T_ADD_R and T_DROP_R by not more than an total amount MAX_dec_thres during the rescue procedure.

24. The MS as recited in claim 20, the processor further programmed for incrementally adjusting Td between time instants $T_N$.

25. The MS as recited in claim 20, the processor further programmed for incrementally adjusting STEP_dec_thres at one or more time instants $T_N$.

26. A mobile station (MS) for communicating with a network and for assisting in performing a rescue procedure when an acknowledgement failure has been detected, the MS comprising:
 a processor programmed for
  incrementally lowering pilot signal strength add and drop thresholds T_ADD_R and T_DROP_R by an amount STEP_dec_thres at one or more specific time instants $t_N$, N=1, 2, . . . M during the rescue procedure, each time instant separated by a time Td,
  lowering T_ADD_R and T_DROP_R in accordance with pilot signal strengths (Ec/Io values) measured at the MS,
  increasing Td between one or more time instants $T_N$ if a difference between a combined pilot Ec/Io for the updated active set of the MS and the combined pilot Ec/Io for a previous updated active set of the MS is larger than a predetermined threshold, and
  decreasing Td between one or more time instants $T_N$ if the difference between the E for the updated active set of the MS and the E for a previous updated active set of the MS is smaller than the predetermined threshold;
 wherein T_ADD_R and T_DROP_R are used by the MS for determining an updated active set of pilots for use in the rescue procedure.

27. A mobile station (MS) for communicating with a network and for assisting in performing a rescue procedure when an acknowledgement failure has been detected, the MS comprising:
 a processor programmed for
  incrementally lowering pilot signal strength add and drop thresholds T_ADD_R and T_DROP_R by an amount STEP_dec_thres at one or more specific time instants $t_N$, N=1, 2, . . . M during the rescue procedure, each time instant separated by a time Td,
  incrementally adjusting STEP_dec_thres at one or more time instants $T_N$,
  adjusting STEP_dec_thres at each time instant $T_N$ by
   determining a number of complete rescue cycles K that could be completed before a rescue procedure timer reaches its terminal count, and
   computing (T_ADD_H−MAX_dec_thres)/(K−1) as a value for STEP_dec_thres at each time instant $T_N$, wherein T_ADD_H is an initial value for T_ADD_R at the start of the rescue procedure;
 wherein T_ADD_R and T_DROP_R are used by the MS for determining an updated active set of pilots for use in the rescue procedure.

28. A mobile station (MS) for communicating with a network and for assisting in performing a rescue procedure when an acknowledgement failure has been detected, the MS comprising:
 a processor programmed for
  incrementally lowering pilot signal strength add and drop thresholds T_ADD_R and T_DROP_R by an amount STEP_dec_thres at one or more specific time instants $t_N$, N=1, 2, . . . M during the rescue procedure, each time instant separated by a time Td,
  incrementally adjusting STEP_dec_thres at one or more time instants $T_N$, and
  increasing STEP_dec_thres at each time instant $T_N$ by
   determining a number of complete rescue cycles K that could be completed before a rescue procedure timer reaches its terminal count,
   determining $\delta = 2*(MAX\_dec\_thres)/(K-1)K$, where $\delta$ is an initial value for STEP_dec_thres at the start of the rescue procedure, and
   computing $\delta * N$ as a value for STEP_dec_thres at each time instant $T_N$, wherein N=1, 2, . . . (K−1);
 wherein T_ADD_R and T_DROP_R are used by the MS for determining an updated active set of pilots for use in the rescue procedure.

29. A mobile station (MS) for communicating with a network and for assisting in performing a rescue procedure when an acknowledgement failure has been detected, the MS comprising:
 a processor programmed for
  incrementally lowering pilot signal strength add and drop thresholds T_ADD_R and T_DROP_R by an amount STEP_dec_thres at one or more specific time instants $t_N$, N=1, 2, . . . M during the rescue procedure, each time instant separated by a time Td,
  incrementally adjusting STEP_dec_thres at one or more time instants $T_N$,
  decreasing STEP_dec_thres at one or more time instants $T_N$, N=1, 2, . . . M, if a difference between a combined pilot Ec/Io for the updated active set of the MS at a particular time instant $T_N$ and the combined pilot Ec/Io for a previous updated active set of the MS at an immediately previous time instant $T_{N-1}$ is larger than a predetermined threshold, and
  increasing STEP_dec_thres at one or more time instants $T_N$, N=1, 2, . . . M, if the difference between the combined pilot Ec/Io for the updated active set of the MS at the particular time instant $T_N$ and the combined pilot Ec/Io for the previous updated active set of the MS at the immediately previous time instant $T_{N-1}$ is smaller than or equal to a predetermined threshold;
 wherein T_ADD_R and T_DROP_R are used by the MS for determining an updated active set of pilots for use in the rescue procedure.

30. A mobile station (MS) for communicating with a network and for assisting in performing a rescue procedure when an acknowledgement failure has been detected, the MS comprising:
 a processor programmed for
  incrementally lowering pilot signal strength add and drop thresholds T_ADD_R and T_DROP_R by an amount STEP_dec_thres at one or more specific time instants $t_N$, N=1, 2, . . . M during the rescue procedure, each time instant separated by a time Td,
  lowering T_ADD_R and T_DROP_R in accordance with pilot signal strengths (Ec/Io values) measured at the MS, and determining MAX_dec_thres by
  selecting a desired combined pilot Ec/Io that gives a high probability of producing a good link as $(Ec/Io)_{desired}$,
  measuring or estimating an Ec/Io value from a strongest pilot in the updated active set as $(Ec/Io)_{max}$,
  solving $(Ec/Io)_{max} + (N-1)(Ec/Io)_{min} \geq (Ec/Io)_{desired}$ for $(Ec/Io)_{min}$; where N is a maximum allowed active set size, and
  computing MAX_dec_thres as T_ADD_R — $(Ec/Io)_{min}$;
wherein T_ADD_R and T_DROP_R are used by the MS for determining an updated active set of pilots for use in the rescue procedure.

31. A mobile station (MS) for communicating with a network and for assisting in performing a rescue procedure when an acknowledgement failure has been detected, the MS comprising:
  a processor programmed for
    incrementally lowering pilot signal strength add and drop thresholds T_ADD_R and T_DROP_R by an amount STEP_dec_thres at one or more specific time instants $t_N$, N=1, 2, ... M during the rescue procedure, each time instant separated by a time Td,
    lowering T_ADD_R and T_DROP_R in accordance with pilot signal strengths (Ec/Io values) measured at the MS,
    measuring Ec/Io for all pilots detectable by the MS having the potentially failing connection,
    placing the measured pilots in a list in order of decreasing Ec/Io, and
    starting with the pilot in the list having the highest Ec/Io and going through the list in order of decreasing Ec/Io,
      measuring the combined Ec/Io for all pilots in the updated active set,
      for a current pilot from the list, determining the combined Ec/Io for all pilots in the updated active set plus the current pilot, and
      adding the current pilot to the updated active set if the current pilot increased the combined Ec/Io measurement by a predetermined percentage;
    wherein T_ADD_R and T_DROP_R are used by the MS for determining an updated active set of pilots for use in the rescue procedure.

32. A communications system for determining an updated active set of pilots used in a rescue procedure for rescuing a mobile station (MS) having a connection with a network for which an acknowledgement failure has been detected, the system comprising:
  a MS, the MS comprising a processor programmed for
    incrementally lowering pilot signal strength add and drop thresholds T_ADD_R and T_DROP_R by an amount STEP_dec_thres at one or more specific time instants $t_N$, N=1, 2, ... M during the rescue procedure, each time instant separated by a time Td, wherein T_ADD_R and T_DROP_R are used by the MS for determining the updated active set of MS pilots for use in the rescue procedure, and
    transmitting a uniform energy signal during a time when the MS is having the acknowledgement failure; and
  a network communicatively coupled to the MS, the network including one or more pilots in a neighborhood of the MS for communicating with the MS, each pilot including a processor programmed for receiving and measuring a strength of the uniform energy signal and adding the pilot to the updated active set used by the network in performing the rescue procedure if the strength of the uniform energy signal is above a predetermined threshold.

33. The system as recited in claim 32, wherein the uniform energy signal transmitted by the MS is a reverse link pilot signal.

34. The system as recited in claim 32, wherein the uniform energy signal transmitted by the MS is a data signal at a predetermined data rate with predetermined data.

35. The system as recited in claim 32, the method for additionally determining the updated active set of pilots for use by the network in the rescue procedure, the method further comprising:
  for each of one or more BSs in the neighborhood of the MS, adding the BS to the updated active set used by the network in accordance with a location of the MS and network planning information.

36. A network for communicating with a mobile station (MS) and for assisting in performing a rescue procedure when the MS has a connection with the network for which an acknowledgement failure has been detected, the MS capable of transmitting a uniform energy signal, the network comprising:
  one or more BS sectors in a neighborhood of the MS for communicating with the MS, each BS sector including a processor programmed for receiving and measuring a strength of the uniform energy signal and adding the BS sector to an updated active set used by the network in performing the rescue procedure if the strength of the uniform energy signal is above a predetermined threshold.

37. The network as recited in claim 36, wherein the uniform energy signal is a reverse link pilot signal.

38. The network as recited in claim 36, wherein the uniform energy signal is a data signal at a predetermined data rate with predetermined data.

39. In a system comprising a network and at least one mobile station (MS) for enabling communications with the at least one MS, the system capable of performing a rescue procedure for rescuing a MS having a connection with the network for which an acknowledgement failure has been detected, a method for adjusting pilot signal strength add and drop thresholds T_ADD_R and T_DROP_R used by the MS in determining an updated active set of pilots for use by the MS in the rescue procedure, the method comprising:
  at one or more specific time instants $t_N$, N=1, 2, ... M during the rescue procedure, each time instant separated by a time Td,
    computing temporary rescue add and drop threshold values by lowering present values for T_ADD_R and T_DROP_R by an amount STEP_dec_thres; and
    computing add and drop threshold algorithms specified in Sections 2.6.6.2.5.2 and 2.6.6.2.3 of the IS-2000-5 Standard, respectively, after replacing static add and drop threshold values in those algorithms with the temporary rescue add and drop threshold values, to generate new values for T_ADD_R and T_DROP_R, respectively.

* * * * *